United States Patent
Herrmann

(10) Patent No.: US 6,407,189 B1
(45) Date of Patent: *Jun. 18, 2002

(54) POLYOLEFIN WAX

(75) Inventor: Hans-Friedrich Herrmann, Dornheim (DE)

(73) Assignee: Clariant GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/577,413

(22) Filed: Dec. 22, 1995

(30) Foreign Application Priority Data

Dec. 28, 1994 (DE) .......................................... 44 46 923

(51) Int. Cl.⁷ ........................... C08F 4/64; C08F 110/06
(52) U.S. Cl. ..................... 526/160; 526/165; 526/351; 526/943; 585/10; 585/512
(58) Field of Search ................... 585/10, 512; 526/160, 526/165, 351, 943

(56) References Cited

U.S. PATENT DOCUMENTS

| 4,962,248 A | 10/1990 | Winter et al. |
| 4,962,262 A | 10/1990 | Winter et al. |
| 5,081,322 A | 1/1992 | Winter et al. |
| 5,677,409 A * | 10/1997 | Inoue et al. ................. 526/351 |
| 5,723,705 A | 3/1998 | Herrmann et al. |

FOREIGN PATENT DOCUMENTS

| CA | 2024718 | 3/1991 |
| DE | 31 48 229 | 6/1983 |
| DE | 31 48 229 A1 | 6/1983 |
| DE | 39 04 468 A1 | 8/1990 |
| EP | 0 321 852 A1 | 12/1988 |
| EP | 0 321 852 | 6/1989 |
| EP | 0 321 853 | 6/1989 |
| EP | 0 384 264 | 8/1990 |
| EP | 0 416 566 | 3/1991 |
| EP | 0 571 882 A2 | 5/1993 |

* cited by examiner

*Primary Examiner*—David W. Wu
*Assistant Examiner*—Caixia Lu
(74) *Attorney, Agent, or Firm*—Connolly Bove Lodge & Hutz LLP

(57) ABSTRACT

The present invention relates to a polypropylene wax having a melt viscosity of from 50 to 100,000 mPas at 170° C., a DSC heat of fusion less than 80 J/g, a DSC melting point of greater than 130° C. and a molecular weight distribution $M_w/M_n$ of less than or equal to 3.

12 Claims, No Drawings

POLYOLEFIN WAX

The present invention relates to a polyolefin wax having a high melting point, reduced isotacticity, reduced crystallinity and reduced hardness and also to a process for its preparation.

The preparation of polyolefin waxes having a broad molecular weight distribution $M_w/M_n$ and an isotactic index of from 60 to 80% by means of supported catalyst, cocatalyst and stereoregulator at temperatures of above 95° C. is known (cf. DE-A 31 48 229). However, in addition to the high temperature, large amounts of hydrogen have to be used as molecular weight regulator. To achieve degrees of polymerization typical of waxes, the hydrogen partial pressure exceeds the partial pressure of the olefin. However, such polymerization conditions cause a significant olefin loss by hydrogenation to the alkane and decreased catalyst activities which result in high residual ash contents in the products. In particular, the high chlorine and titanium contents require complicated purification steps for the product.

The preparation of 1-olefin polymer waxes having a narrow molecular weight distribution and high isotacticity using metallocene catalysts (EP 321 852) is known. For many wax applications, the high isotacticity and hardness of these, products, which shows up in a high heat of fusion of more than 80 [J/g] for polypropylene waxes, is disadvantageous.

The preparation of a 1-olefin stereoblock polymer wax (EP 321 853) using metallocene catalysts which lower the isotacticity by means of a large number of misinsertions is known. Disadvantages are the low activity of these catalyst systems and the lack of controllability of the isotacticity.

The preparation of polyolefin waxes having different isotacticity by changing the polymerization temperature (EP 416 566 is known. However, disadvantages are that the activity of the catalyst decreases sharply with the polymerization temperature and that the achievable molecular weights are low and cannot be adjusted independently of the isotacticity.

Furthermore, it is known that the crystallinity can be reduced by copolymerization (EP 384 264). A disadvantage is the lowering of the melting point of the copolymers in comparison with the melting point of the homopolymer, which limits the range of applications.

It is therefore an object of the present invention to provide a polyolefin wax which avoids the disadvantages of the prior art and, in particular, has reduced isotacticity and hardness at the same time as high melting point.

The present invention accordingly provides a polyolefin wax having a melt viscosity of from 0.1 to 100,000 mPas, preferably from 1 to 60,000 mPas, particularly preferably from 50 to 60,000 mPas, at 170° C., a DSC heat of fusion less than 80 J/g, a DSC melting point of greater than 130° C. and a molecular weight distribution $M_w/M_n$ of less than or equal to 3. Preference is given to polypropylene waxes.

The polyolefin waxes of the present invention can be extracted to an extent of at least 10% by weight with diethyl ether. A possible way of determining the isotacticity of crystalline polyolefin waxes is the extraction method using a solvent in a Soxhlet extractor, with the highly crystalline isotactic products remaining undissolved in the residue. The ether-extracted part corresponds to the atactic parts of the polyolefin wax.

The present invention also provides a process for preparing polyolefin waxes having a melt viscosity of from 50 to 100,000 mPas at 170° C., a DSC heat of fusion less than 80 J/g, a DSC melting point of greater than 130° C. and a molecular weight distribution $M_w/M_n$ of less than or equal to 3, in the presence of a catalyst comprising a stereo-rigid metallocene compound A and a cocatalyst B. with the metallocene compound A being used as a mixture of racemic form and meso form in a rac/meso ratio of <0.5.

In the racemic form (rac form) of the stereorigid metallocene compound A, the two enantiomers can be converted into one another only by the mirroring operation. In the case of the meso form, the structure and its mirror image can be converted into one another by rotation. The term meso form also includes the case where, when the ligands of the metallocene are different such as in dimethylsilyl(2-methylindenyl)(indenyl)ZrCl$_2$, a second pair of enantiomers arises in which the more voluminous parts of the two ligand systems each lie above one another.

The compounds (b) and (c) below are accordingly the rac form and the compounds (a) and (d) below are the meso form.

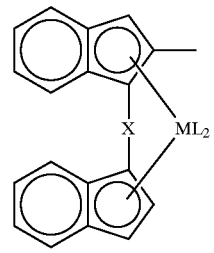

(a)

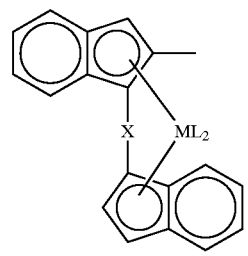

(b)

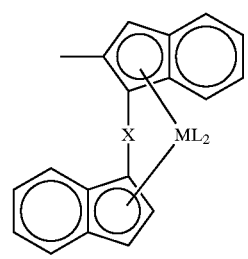

(c)

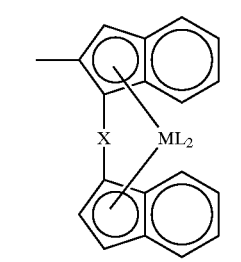

(d)

$X=R^7$, $ML_2=M^1R^{10}R^{11}$ as defined for formula I

The stereorigid metallocene compound A is preferably a metallocene of the formula I

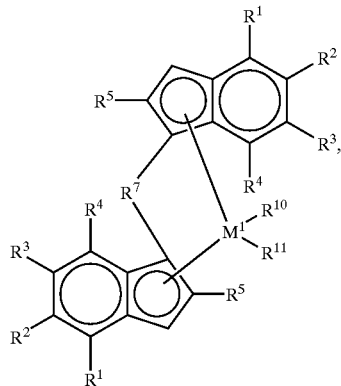
(I)

where
- $M^1$ is titanium, zirconium, hafnium, vanadium, niobium or tantalum,
- $R^1$, $R^2$, $R^3{}_1$, $R^4$ and $R^5$ are identical or different and are each hydrogen, $(C_1-C_{20})$alkyl, $(C_6-C_{14})$aryl, $(C_1-C_{10})$alkoxy, $(C_2-C_{10})$alkenyl, $(C_7-C_{20})$arylalkyl, $(C_7-C_{20})$alkylaryl, $(C_6-C_{10})$aryloxy, $(C_1-C_{10})$fluoroalkyl, $(C_6-C_{10})$haloaryl, $(C_2-C_{10})$alkynyl, a radical —$SiR^6{}_3$, where $R^6$ is $(C_1-C_{10})$-alkyl, a halogen atom or a heteroaromatic radical having 5 or 6 ring atoms and able to contain one or more hetero atoms, or adjacent radicals $R^1$ to $R^4$ together with the atoms connecting them form one or more rings,
- $R^7$ is a radical

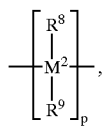

where
- $M^2$ is carbon, silicon, germanium or tin,
- $R^8$ and $R^8$ are identical or different and are each hydrogen, $(C_1-C_{20})$alkyl, $(C_6-C_{14})$aryl, $(C_1-C_{10})$alkoxy, $(C_2-C_{10})$alkenyl, $(C_7-C_{20})$arylalkyl, $(C_7-C_{20})$alkylaryl, $(C_6-C_{10})$aryloxy, $(C_1-C_{10})$fluoroalkyl, $(C_6-C_{10})$haloaryl, $(C_2-C_{10})$alkynyl or halogen, or $R^8$ and $R^9$ together with the atom connecting them form a ring, p is 0, 1, 2 or 3 and $R^{10}$ and $R^{11}$ are identical or different and are each hydrogen, $(C_1-C_{10})$alkyl, $(C_1-C_{10})$alkoxy, $(C_6-C_{10})$aryl, $(C_6-C_{10})$aryloxy, $(C_2-C_{10})$alkenyl, $(C_7-C_{40})$arylalkyl, $(C_7-C_{40})$alkylaryl, $(C_8-C_{40})$ arylalkenyl, hydroxy or a halogen atom.

The compound of the formula I is preferably one in which $M^1$ is zirconium or hafnium, in particular zirconium, $R^1$, $R^2$, $R^3{}_1$, $R^4$ are identical or different and are each hydrogen, $(C_1-C_{10})$alkyl, $(C_6-C_{14})$aryl, $(C_1-C_4)$alkoxy, $(C_2-C_6)$alkenyl, $(C_1-C_6)$fluoroalkyl, a halogen atom or a heterocyclic aromatic radical having 5 or 6 ring atoms and able to contain one or more hetero atoms, or adjacent radicals $R^1$ to $R^4$ together with the atoms connecting them form a ring, and $R^5$ is $(C_1-C_{10})$alkyl, $M^2$ is carbon or silicon, in particular silicon, $R^8$ and $R^9$ are identical or different and are each hydrogen, $(C_1-C_6)$alkyl, $(C_6-C_{10})$aryl, $(C_1-C_6)$alkoxy, $(C_2-C_4)$alkenyl, $(C_7-C_{10})$arylalkyl, $(C_7-C_{10})$ alkylaryl, or $R^8$ and $R^9$ together with the atom connecting them form a ring, p is 1 or 2, preferably 1, and $R^{10}$ and $R^{11}$ are identical or different and are each hydrogen, $(C_1-C_3)$alkyl, in particular methyl, $(C_1-C_3)$ alkoxy, $(C_6-C_8)$aryl, $(C_6-C_8)$aryloxy, $(C_2-C_4)$alkenyl, $(C_7-C_{10})$ arylalkyl, $(C_7-C_{10})$ alkylaryl, $(C_8-C_{12})$arylalkenyl or a halogen atom, preferably chlorine.

Examples of the metallocene component of the catalyst system of the present invention are the rac and meso forms of the following metallocene compounds:

dimethylsilanediylbis(indenyl)zirconium dichloride
dimethylsilanediylbis(tetrahydroindenyl)zirconium dichloride
dimethylsilanediylbis(4-naphthylindenyl)zirconium dichloride
dimethylsilanediylbis(2-methylbenzoindenyl)zirconium dichloride
dimethylsilanediylbis(2-methylindenyl)zirconium dichloride
dimethylsilanediylbis(2-methyltetrahydroindenyl) zirconium dichloride
dimethylsilanediylbis(2-methyl-4-(1-naphthyl)indenyl) zirconium dichloride
dimethylsilanediylbis(2-methyl-4-(2-naphthyl)indenyl) zirconium dichloride
dimethylsilanediylbis(2-methyl-4-phenylindenyl)zirconium dichloride
dimethylsilanediylbis (2-methyl-4-t-butylindenyl)zirconium dichloride
dimethylsilanediylbis(2-methyl-4-isopropylindenyl) zirconium dichloride
dimethylsilanediylbis(2-methyl-4-ethylindenyl)zirconium dichloride
dimethylsilanediylbis(2-methyl-4-α-acenaphthindenyl) zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-ethylindenyl)zirconium dichloride
dimethylsilanediylbis(2-ethyl-4-phenylindenyl)zirconium dichloride
dimethylsilanediylbis(2-methyl-4,5-benzoindenyl) zirconium dichloride
dimethylsilanediylbis(2-methyl-4,6-diisopropylindenyl) zirconium dichloride
dimethylsilanediylbis(2-methyl-4,5-diisopropylindenyl) zirconium dichloride
dimethylsilanediylbis(2,4,6-trimethylindenyl)zirconium dichloride
dimethylsilanediylbis(2,5,6-trimethylindenyl)zirconium dichloride dimethylsilanediylbis(2,4,7-trimethylindenyl)zirconium dichloride
dimethylsilanediylbis(2-methyl-5-isobutylindenyl) zirconium dichloride
dimethylsilanediylbis(2-methyl-5-t-butylindenyl)zirconium dichloride
methyl(phenyl)silanediylbis(2-methyl-4-phenylindenyl) zirconium dichloride
methyl(phenyl)silanediylbis(2-methyl-4,6-diisopropyl-indenyl)zirconium dichloride
methyl(phenyl)silanediylbis(2-methyl-4-isopropylindenyl) zirconium dichloride
methyl(phenyl)silanediylbis(2-methyl-4,5-benzoindenyl) zirconium dichloride
methyl(phenyl)silanediylbis(2-methyl-4,5-(methylbenzo)-indenyl)zirconium dichloride
methyl(phenyl)silanediylbis(2-methyl-4,5-(tetramethyl-benzo)indenyl)zirconium dichloride
methyl(phenyl)silanediylbis(2-methyl-4-α-acenaphth-indenyl)zirconium dichloride
methyl(phenyl)silanediylbis(2-methylindenyl)zirconium dichloride
methyl(phenyl)silanediylbis(2-methyl-5-isobutylindenyl) zirconium dichloride
1,2-ethanediylbis(2-methyl-4-phenylindenyl)zirconium dichloride
1,2-ethanediylbis(2-methyltetrahydroindenyl)zirconium dichloride
1,2-ethanediylbis(tetrahydroindenyl)zirconium dichloride
1,4-butanediylbis(2-methyl-4-phenylindenyl)zirconium dichloride
1,2-ethanediylbis(2-methyl-4,6-diisopropylindenyl) zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride and also the dialkyl derivatives of the abovementioned metallocenes, for example:

dimethylsilanediylbis(indenyl)dimethylzirconium
dimethylsilanediylbis(tetrahydroindenyl)diethylzirconium
dimethylsilanediylbis(2-methylbenzoindenyl) dimethylzirconium
dimethylsilanediylbis(2-methylindenyl)dibutylzirconium and also the monoalkyl derivatives of the abovementioned metallocenes, for example:

dimethylsilanediylbis(indenyl)methylzirconium chloride
dimethylsilanediylbis(tetrahydroindenyl)ethylzirconium chloride
dimethylsilanediylbis(2-methylbenzoindenyl) methylzirconium chloride
dimethylsilanediylbis(2-methylindenyl)butylzirconium chloride.

Particular preference is given to the rac and meso forms of the following metallocene compounds:

dimethylsilanediylbis(2-methyl-4-α-acenaphthindenyl) zirconium dichloride
dimethylsilanediylbis(2-ethyl-4-phenylindenyl)zirconium dichloride.

Particularly suitable compounds are the rac and meso forms of the following metallocene compounds:

dimethylsilyl(2-methyl-4,5-benzoindenyl)$_2$ZrCl$_2$
dimethylsilyl(2-methylindenyl)$_2$ZrCl$_2$
dimethylsilyl(2-methylindenyl) (2-methyl-4,5-benzo-indenyl)ZrCl$_2$
dimethylsilyl(2-methyl-4-phenylindenyl)$_2$ZrCl$_2$
dimethylsilyl(2-methylindenyl) (2-methyl-4-phenylindenyl)$_2$ZrCl$_2$
dimethylsilyl(2-methyl-4,6-diisopropylindenyl)$_2$ZrCl$_2$
dimethylsilyl(2,5,6-trimethylindenyl)$_2$ZrCl$_2$
dimethylsilyl(2-methyl-4-naphthylindenyl)$_2$ZrCl$_2$.

In the synthesis of the metallocene compound A used in the process of the present invention, the ratio of rac to meso form directly after the metallocene synthesis is generally between 2:1 and 0.5:1. However, crystallization allows the metallocene to be enriched in the desired form and the ratio of rac and meso forms to be set as desired.

A further possible way of adjusting the rac/meso ratio is the addition of an enriched, for example, meso form of a metallocene to a rac/meso 1/1 mixture from the synthesis. The enriched meso form of metallocenes is formed in large amounts in the preparation of the rac metallocenes for the preparation of highly isotactic polyolefin molding compositions.

In principle, the cocatalyst B in the process of the present invention can be any compound which, owing to its Lewis acidity, can convert the neutral metallocene into a cation and stabilize this ("labile coordination"). In addition, the cocatalyst or the anion formed therefrom should undergo no further reactions with the metallocene cation formed (EP 427 697). The cocatalyst used is preferably an aluminum compound and/or a boron compound.

The boron compound preferably has the formula $R^{12}_x NH_{4-x} BR^{13}_4$, $R^{12}_x PH_{4-x} BR^{13}_4$, $R^{12}_3 CBR^{13}_4$ or $BR^{13}_3$, where x is a number from 1 to 4, preferably 3, the radicals $R^{12}$ are identical or different, preferably identical, and are each $C_1$–$C_{10}$-alkyl or $C_6$–$C_{18}$-aryl, or two radicals $R^{12}$ together with the atoms connecting them form a ring, and the radicals $R^{13}$ are identical or different, preferably identical, and are each $C_6$–$C_{18}$-aryl which can be substituted by alkyl, haloalkyl or fluorine. In particular, $R^{12}$ is ethyl, propyl, butyl or phenyl and $R^{13}$ is phenyl, pentafluorophenyl, 3,5-bistrifluoromethylphenyl, mesityl, xylyl or tolyl (EP 277 003, EP 277 004 and EP 426 638).

The cocatalyst used is preferably an aluminum compound such as aluminoxane and/or an aluminum alkyl.

The cocatalyst used is particularly preferably an aluminoxane, in particular of the formula IIa for the linear type and/or the formula IIb for the cyclic type,

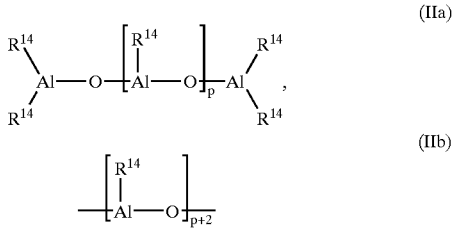

where, in the formulae IIa and IIb, the radicals $R^{14}$ are identical or different and are each hydrogen or a $C_1$–$C_{20}$-hydrocarbon group such as a $C_1$–$C_{18}$-alkyl group, a $C_6$–$C_{18}$-aryl group or benzyl, and p is an integer from 2 to 50, preferably from 10 to 35.

The radicals $R^1$ are preferably identical and are each hydrogen, methyl, isobutyl, phenyl or benzyl, particularly preferably methyl.

If the radicals $R^{14}$ are different, they are preferably methyl and hydrogen or alternatively methyl and isobutyl, with hydrogen or isobutyl preferably being present in a numerical proportion of from 0.01 to 40% (of the radicals $R^{14}$).

The methods of preparing the aluminoxanes are known (DE 4 004 477).

The exact spatial structure of the aluminoxanes is not known (J. Am. Chem. Soc. (1993) 115, 4971). For example, it is conceivable that chains and rings join to form larger two-dimensional or three-dimensional structures.

Regardless of the manner of preparation, all aluminoxane solutions have in common a variable content of unreacted aluminum starting compound which is present in free form or as adduct.

It is possible to preactivate the metallocene compound of the present invention prior to use in the polymerization reactor using a cocatalyst, in particular an aluminoxane. This significantly increases the polymerization activity. The preactivation of the metallocene compound is preferably carried out in solution. Here, the metallocene compound is preferably dissolved in a solution of the aluminoxane in an inert hydrocarbon. Suitable inert hydrocarbons are aliphatic or aromatic hydrocarbons. Preference is given to using toluene.

The concentration of the aluminoxane in the solution is in the range from about 1% by weight to the saturation limit, preferably from 5 to 30% by weight, in each case based on the total amount of solution. The metallocene can be used in the same concentration, but it is preferably used in an amount of $10^{-4}$–1 mol per mol of aluminoxane. The preactivation time is from 5 minutes to 60 hours, preferably from 5 to 60 minutes. The preactivation is carried out at a temperature of from −78 to 100° C., preferably from 0 to 70° C. The metallocene compound compound is here preferably used in a concentration, based on the transition metal, of from $10^{-3}$ to $10^{-8}$, preferably from $10^{-4}$ to $10^{-7}$ mol of transition metal per $dm^3$ of solvent or per $dm^3$ of reactor volume. The aluminoxane is preferably used in a concentration of from $10^{-6}$ to $10^{-1}$ mol, preferably from $10^{-5}$ to $10^{-2}$ mol, per $dm^3$ of solvent or per dm3 of reactor volume. The other cocatalysts mentioned are used in approximately equimolar amounts to the metallocene compound. However, higher concentrations are also possible in principle.

In the process of the present invention, the metallocene compound is preferably reacted with the cocatalyst outside the polymerization reactor in a separate step using a suitable solvent. The catalyst can be applied to a support during this procedure.

In the process of the present invention, a prepolymerization can be carried out by means of the metallocene compound. For the prepolymerization, the (or one of the) olefin(s) used in the polymerization is preferably used.

The stereorigid metallocene compound A is preferably reacted with the cocatalyst B outside the polymerization reactor in a separate step using a suitable solvent. The catalyst can be applied to a support during this procedure. For this purpose, the metallocene compound can be first reacted with the support and subsequently with the cocatalyst. The cocatalyst can also be supported first and subsequently reacted with the metallocene compound. It is also possible to support the reaction product of metallocene compound and cocatalyst. During these processes of application to a support, the ratio of rac to meso form of the metallocene remains unchanged because of the similar chemical properties. Suitable support materials are, for example, silica gels, aluminum oxides or other inorganic supports such as magnesium chloride or graphite. The preparation of a supported cocatalyst can be carried out, for example, as described in EP 567952. Another suitable support material is a polymer powder as described, for example, in EP 563917.

The catalyst can be added as solution, as suspension or dry in supported form. Suitable solvents or suspension media for catalyst or cocatalyst are hydrocarbons generally such as toluene, heptane, hexane, pentane, butane or propane and also industrial diesel oils.

The polyolefin wax of the present invention is, owing to the broad adjustability of the hardness, suitable for a wide range of applications, e.g. as formulation component in toners in the case of high hardness, or as base for pigment preparation, as auxiliary in the processing of plastics and as melt adhesive (hot-melt) in the case of products of low hardness.

This process enables the preparation of polyolefin waxes having a narrow molecular weight distribution of less than 3. If the atactic part is enriched by ether extraction of the total sample, the GPC spectrum of the low-isotacticity part extractable with ether is virtually identical with the GPC of the total sample.

The process of the present invention can be carried out in solution, in suspension or in the gas phase at temperatures of from 40 to 120° C., at an olefin partial pressure of from 1 to 50 bar, at a hydrogen partial pressure of from 0 to 10 bar, with addition (based on Al) of from 0.01 to 10 mmol of cocatalyst/liter of suspension medium at a catalyst/cocatalyst ratio of from 1:1 to 1:1000.

In the process of the present invention, preference is given to polymerizing olefins of the formula $R^aCH=CHR^b$, where $R^a$ and $R^b$ are identical or different and are each a hydrogen atom or an alkyl radical having from 1 to 28 carbon atoms, or $R^a$ and $R^b$ together with the carbon atoms connecting them form one or more rings. Examples of such olefins are propylene, 1-butene, 1-pentene, 1-hexene, 4-methyl-1-pentene, 1-octene, norbornene or norbornadiene. Preference is given to propylene.

In the polymerization, prior to the addition of the catalyst, a further organoaluminum compound C such as trimethylaluminum, triethylaluminum, triisobutylaluminum or isoprenylaluminum can be additionally added in a concentration of from 1 to 0.001 mmol of Al per $dm^3$ of reactor volume for making the polymerization system inert.

The polymerization can be carried out batchwise or continuously and in one or more stages, with the low time-dependent decrease in the polymerization activity enabling any desired residence times to be realized.

The molecular weight of the waxes of the present invention can be regulated using hydrogen in accordance with the desired melt viscosity. This enables melt viscosities of PP waxes in the range from 50 to 100,000 mPas, measured at 170° C., to be obtained. The molecular weight can also be regulated by changing the polymerization temperature.

The polyolefin waxes of the present invention are particularly suitable as additives, e.g. for plastics.

EXAMPLES

Melting points and heats of fusion were determined by DSC measurements at a heating and cooling rate of 20° C./min, using the values from the 2nd heating. The melt viscosities are determined at 170° C. using a rotation viscometer. The determination of the IR isotacticity is carried out using the method of J. P. Luongo, J. Appl. Polym. Chem., 3, 302 (1960).

The flow hardness is determined by a ball indentation method which is published in the Standard Methods of the German Association for Fat Chemistry (DGF) under the number M-III 9a (57).

Example 1

An inert 100 $dm^3$ reactor as described in EP 602 509 was charged with 30 kg of propene and 42 mmol of triethylaluminum, the mixture was heated to 60° C. while stirring at 170 rpm and 0.5 bar of hydrogen were metered in. In parallel thereto, 30 mg of dimethylsilylbis(2-methyl-benzoindenyl) zirconium dichloride having a rac/meso ratio of 1/8 are dissolved in 100 ml of methylaluminoxane solution in toluene and stirred for 15 minutes. The polymerization is started by pumping in the catalyst solution over a period of 20 minutes. By means of regulation of the cooling, the internal temperature of the reactor is allowed to rise to 70° C. Hydrogen was metered in and kept constant at 1.5% by volume on the basis of GC measurement. After 1 hour, the polymerization was stopped using $CO_2$ and the suspension was worked up in the work-up vessel by melting after distilling off the propylene. This gives 7.0 kg of PP wax having a melt viscosity at 170° C. of 1800 mPas. The properties are summarized in Table 1.

Example 2

Example 1 was repeated using 16 mg of the same metallocene at rac/meso=1/6. Yield: 5.67 kg. Properties are summarized in Table 1.

Example 3

Example 1 was repeated using 15.3 mg of the same metallocene at rac/meso=1/2.9. Yield: 6.6 kg. Properties are summarized in Table 1.

Example 4

Example 1 was repeated using 15 mg of the same metallocene at rac/meso=1/2.7 and using 2.8% by volume of hydrogen. Yield: 11.55 kg. Properties are summarized in Table 1.

Comparative Example 1

Example 1 was repeated using 10 mg of the same metallocene at rac/meso=12/1. Yield: 8.5 kg. Properties are summarized in Table 1.

TABLE 1

| Example: | 1 | 2 | 3 | 4 | C1 |
|---|---|---|---|---|---|
| rac/meso: | 1/8 | 1/6 | 1/2.9 | 1/2.7 | 12/1 |
| kg/mg of cat.: | 0.23 | 0.35 | 0.43 | 0.77 | 0.85 |
| Melt viscosity [mPas]: | 1800 | 1740 | 1500 | 282 | 1910 |
| $T_m$ (° C.): | 145 | 147 | 142 | 144 | 144 |
| Heat of fusion (J/g): | 48 | 52 | 68 | 77 | 107 |
| IR isotactic index | 48% | 62% | 61% | 78% | 92% |
| Flow hardness [bar]: | 180 | 223 | 560 | 810 | >1000 |
| Ether extractable: | 47% | | 37% | 14% | 3% |
| $M_n$ [g/mol]: | 8810 | | 9065 | 4180 | 9085 |
| $M_w/M_n$: | 2.5 | | 2.4 | 2.8 | 2.5 |
| $M_n$ of ether extract: | 11300 | | 11200 | | 11300 |
| $M_w/M_n$ (*): | 2.5 | | 2.5 | | 2.5 |

Example 5

Example 1 was repeated using 65 mg of dimethylsilylbis-(2-methylindenyl)zirconium dichloride having rac/meso=1/5 and using 1.5% by volume of hydrogen for regulation. Yield: 6.8 kg. Properties are summarized in Table 2.

Comparative Example 2

Example 5 was repeated using 22 mg of the same metallocene at rac/meso=1/1. Yield: 15.2 kg. Properties are summarized in Table.2.

Example 6

Example 1 was repeated using 70 mg of dimethylsilyl-(2-methylindenyl) (2-methyl-4,5-benzoindenyl)zirconium dichloride having rac/meso=1/6 and using 1% by volume of hydrogen for regulation. Yield: 10.4 kg. Properties are summarized in Table 2.

Comparative Example 3

Example 6 was repeated using 25 mg of the same metallocene at rac/meso=1/1. Yield: 7.4 kg. Properties are summarized in Table 2.

Example 7

Example 1 was repeated using 21.6 mg of dimethylsilyl-(2-methyl-4-phenylindenyl)zirconium dichloride having rac/meso=1/5.6 and using 9.2% by volume of hydrogen for regulation. Yield: 6.5 kg. Properties are summarized in Table 2.

Comparative Example 4

Example 7 was repeated using 20 mg of the same metallocene at rac/meso=1/1. Yield: 9.6 kg. Properties are summarized in Table 2.

TABLE 2

| Example: | 5 | C2 | 6 | C3 | 7 | C4 |
|---|---|---|---|---|---|---|
| rac/meso: | 1/5 | 1/1 | 1/6 | 1/1 | 1/56 | 1/1 |
| kg/mg of cat.: | 0.104 | 0.691 | 0.149 | 0.296 | 0.3 | 0.48 |
| Melt viscosity [mPas]: | 2300 | 3180 | 1830 | 2000 | 2266 | 1410 |
| $T_m$ (° C.): | 140 | 140 | 138 | 138 | 157 | 152 |
| Heat of fusion (J/g): | 75 | 125 | 70 | 107 | 76 | 110 |
| IR isotactic index | 77% | 86% | 72% | 83% | 79% | 91% |
| Flow hardness [bar]: | 910 | >1000 | 810 | >1000 | 817 | >1000 |
| Ether extractable: | 12.5% | n.d. | 16.2% | n.d. | n.d. | |
| $M_n$ [g/mol]: | 11600 | | 9400 | | | |
| $M_w/M_n$: | 2.5 | | 2.4 | | | |
| $M_n$ of ether extract: | 8430 | | 7330 | | | |
| $_w/M_n$ (*): | 2.6 | | 2.9 | | | |

Comparative Example 5

The comparative experiment to Example 3 in DE 3148229 was repeated. This gave a polypropylene wax having the following properties:

| | |
|---|---|
| Melt viscosity [mpas]: | 1810 |
| $T_m$ (° C.): | 145.5 |
| Heat of fusion (J/g): | 35 |
| IR isotactic index | 70% |
| Flow hardness [bar]: | 510 |
| Ether extractable: | 39% |
| $M_n$ [g/mol]: | 2600 |
| $M_w/M_n$: | 6.9 |
| $M_n$ of ether extract: | 1570 |
| $M_w/M_n$ ("): | 4.6 |
| $M_n$ of extraction residue: | 5280 |
| $M_w/M_n$ ("): | 5.5 |

What is claimed is:

1. A process for preparing a polyolefin wax having a melt viscosity of from 50 to 100,000 mPas at 170° C., a DSC heat of fusion less than 80 J/g, a DSC melting point of greater then 130° C., an isotactic index from 48 to 79% and a molecular weight distribution $M_w/M_n$ of less than or equal to 3, in the presence of a catalyst comprising a metallocene compound A and a cocatalyst B, with the metallocene compound A being used as a mixture of rac and meso forms in a rac/meso ratio of <0.5.

2. The process as claimed in claimed 1, wherein the melt viscosity is from 50 to 60,000 mPas at 170° C.

3. The process as claimed in claim 1, wherein the melt viscosity is from 280 to 2,300 mPas.

4. The process according to claim 1, wherein the melt viscosity is from 1,500 to 2,300 mPas.

5. The process according to claim 4, wherein the molecular weight distribution is between 2.4 and 2.9.

6. The process according to claim 1, wherein the molecular weight distribution is between 2.4 and 2.9.

7. The process according to claim 1, wherein the wax has a flow hardness between 180 and 910 bar.

8. The process according to claim 5, wherein the flow hardness is from 560 to 817 bar.

9. The wax according to claim 1, wherein the isotactic index is from 48 to 79%.

10. The process according to claim 8, wherein the isotactic index is from 48 to 79%.

11. The process according to claim 1, wherein the isotactic index is from 72 to 79%.

12. The process according to claim 8, wherein the isotactic index is from 72 to 79%.

* * * * *